Dec. 9, 1952     W. L. PETERSON     2,620,656
COMPRESSION CHECKING GAUGE
Filed March 18, 1949
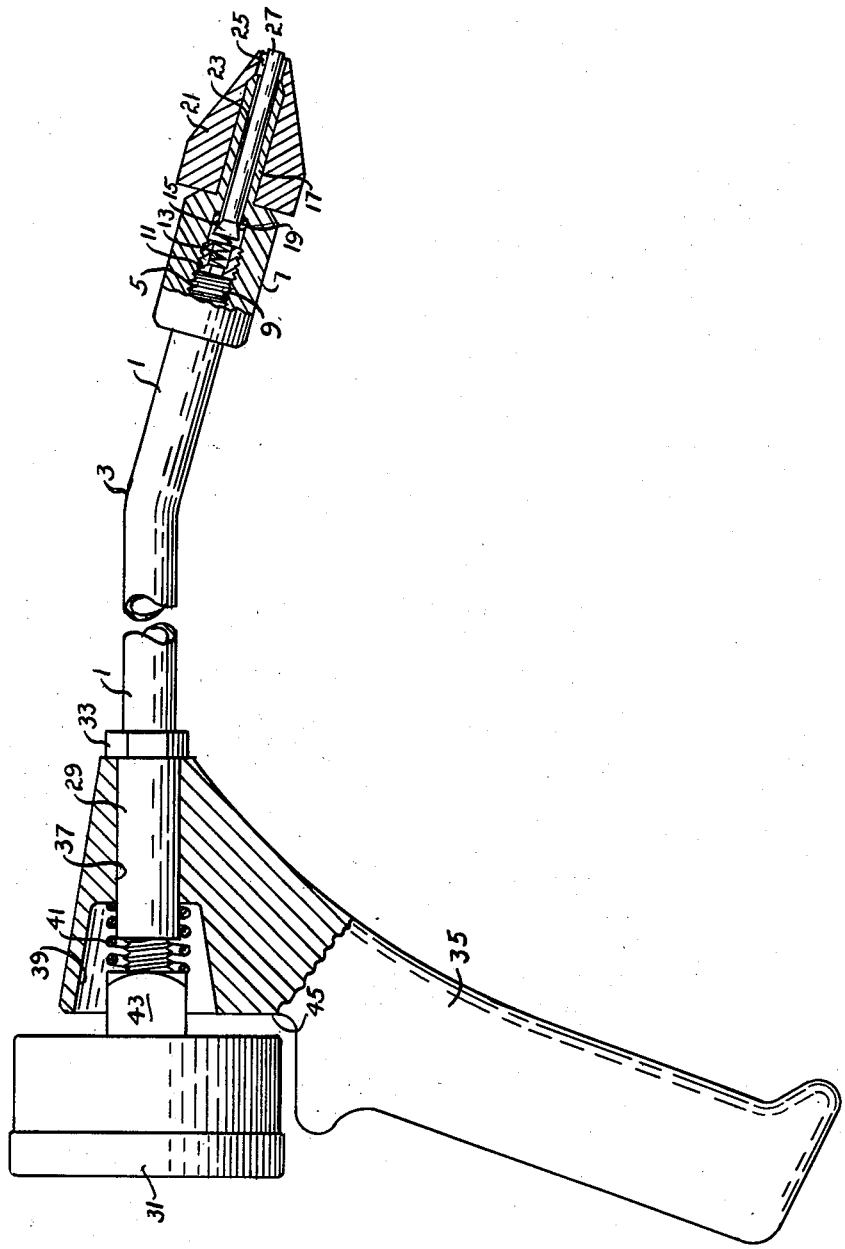
WAYNE L. PETERSON
*INVENTOR.*
BY Edmund W. C. Kimm
ATTORNEY Patented Dec. 9, 1952

2,620,656

UNITED STATES PATENT OFFICE 2,620,656

COMPRESSION CHECKING GAUGE

Wayne L. Peterson, Algona, Iowa, assignor to Joseph Weidenhoff, Incorporated, Algona, Iowa, a corporation of Illinois Application March 18, 1949, Serial No. 82,101

4 Claims. (Cl. 73—116)

This invention relates to a compression checking gauge used in determining the compression attained in the cylinder of an internal combustion engine.

An object of the invention is to provide a rotatable handle which will permit relative angular displacement of the handle and the sealing cone of the device.

Other objects will become apparent from a study of this specification and the drawing which is attached hereto and made a part hereof.

The single figure of the drawing discloses the gauge and handle in elevation with some portions broken away to show the structure.

The device comprises a tube 1 which is preferably bent at 3. The one end of the tube is threaded at 5 and enters a valve body 7 which has a threaded bore 9.

A retainer 11 for a spring 13 is screwed in the bore and the spring bears upon a poppet type valve 15 which has its stem guided in a sleeve like extension 17 of the body.

The valve is normally held on a seat 19 which is fixed in a cylindrical portion of the bore.

A conical rubber plug 21 is fitted over the sleeve to seal the hole in the cylinder in which it is inserted, usually a spark plug hole, and the lower end of the plug has a central opening 25. The opening has a diameter greater than that of the bore 23 in sleeve 17 so that the gas may flow through the opening, valve and tube to the gauge.

The valve stem 27 preferably projects beyond the plug for a purpose to be described.

The opposite end of the tube is screwed into one end of coupling member 29 while the pressure gauge 31 is screwed into the other end thereof.

A hexagonal shoulder 33 is formed on the lower end of the member 29 to serve as a stop for the pistol grip type of handle 35 which has a bore 37 adapted to rotatably fit on the member.

A counterbore 39 in the handle provides a seat for a relatively stiff spring 41 which fits over the end of the member 29 and bears on the square boss 43 of the gauge. The handle is thus held against the shoulder 33 so that while the tube 1 and its rigidly attached parts may be rotated relative to the handle, such rotation will not be a free rotation. Rather, the operator must hold one part while adjusting the other with respect to it.

The handle is recessed at 45 so that the gauge when installed does not project far beyond the handle.

This rotative adjustment is made so that the plug 21 can be properly seated in the plug hole and the handle can be swung so as to clear accessories or parts of the engine which would otherwise, by interference with the handle, prevent proper seating of the plug.

As the engine is turned over, the gas pressure is conducted to the gauge 31 through bore 23, valve 15 and tube 1. The valve 15 is seated by the spring 13 to hold the reading.

When a new reading is to be taken, the operator needs merely to tap the valve stem 27 against a convenient surface to lift valve 15 from its seat and thus bleed the pressure from the tube.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I consider to be new and desire to protect by Letters Patent of the United States is:

1. In a compression checking device, the combination of an angular tube having an inlet, a valve therefor and a sealing plug at one end of the tube for engagement with a spark plug opening, a stop, spaced from the other end, a handle rotatably mounted on said other end in contact with the stop, a gauge connected to said other end, a spring compressed between the gauge and handle for forcing the latter into frictional engagement with said stop.

2. In a compression checking device, the combination of a bent tube having an inlet, a valve therefor and a sealing plug at one end of the tube for engagement with a spark plug opening, a stop, spaced from the other end, a laterally extending handle rotatably mounted on said other end in contact with the stop and a gauge connected to said other end.

3. In a compression checking device, the combination of a bent tube having an inlet, a valve therefor and a sealing plug at one end of the tube for engagement with a spark plug opening, a stop, spaced from the other end, a laterally extending pistol grip type handle rotatably mounted on said other end in contact with the stop and a gauge connected to said other end.

4. In a compression checking device, the combination of a tube, a gauge on one end thereof, a valve body at the other having an inlet, an outwardly closing valve in said inlet and a sealing plug mounted on the body for engagement with a spark plug opening, said valve having a stem which is movable relative to said body and plug and which projects through and outwardly beyond said plug, said valve serving to trap fluid under pressure in said tube and gauge, and said stem being operable to unseat the valve and release said fluid to restore the pressure in the tube and gauge to normal.

WAYNE L. PETERSON.

REFERENCES CITED

The following references are of record in the file of this patent:

UNITED STATES PATENTS

| Number | Name | Date |
| --- | --- | --- |
| 1,756,801 | Trippeda et al. | Apr. 29, 1930 |
| 1,899,920 | Litterio | Feb. 28, 1933 |
| 2,212,466 | Bradford | Aug. 20, 1940 |
| 2,280,411 | Kiene | Apr. 21, 1942 |
| 2,457,401 | Rupley | Dec. 28, 1948 |